Patented Sept. 10, 1946

2,407,373

UNITED STATES PATENT OFFICE 2,407,373

DEHYDROGENATION OF HYDROCARBONS

Kenneth K. Kearby, Elizabeth, N. J., assignor to Standard Oil Development Company, a corporation of Delaware No Drawing. Application March 27, 1943, Serial No. 480,843

4 Claims. (Cl. 260—680)

The present invention relates to improvements in the art of dehydrogenating hydrocarbons and, more particularly, it relates to active catalysts suitable for dehydrogenating mono-olefins to form diolefins and also for dehydrogenating alkyl substituted aromatics such as ethyl benzene.

In my present invention, I have discovered a class of catalysts which are active for the dehydrogenation of mono-olefins and, in general, this class of catalysts consists of a copper base on which compounds of chromium, vanadium, manganese, iron, cobalt, nickel, palladium and platinum may be supported, and I add a small amount of a compound of potassium to promote the activity of these catalysts.

Examples of compositions which are suitable for dehydrogenating butene to form butadiene in the presence of steam are the following:

| Catalyst No. | Composition in per cent by weight |
|---|---|
| A | 75% CuO, 20% $Cr_2O_3$, 5% $K_2O$. |
| B | 75% CuO, 20% $Fe_2O_3$, 5% $K_2O$. |
| C | 75% CuO, 20% $MnO_2$, 5% $K_2O$. |

In order to test the efficiency and activity of these catalysts, I made the following tests with the results as given below:

I charged to a reactor containing catalyst "A" above, a mixture of butene and steam in the ratio of 7 volumes of steam per volume of butene, at a feed rate of 750 volumes, at 0° C. and at 1 atmosphere pressure of butene per volume of catalyst per hour while maintaining a temperature within the reaction zone of about 1200° F. and atmospheric pressure. In the run employing catalyst "A," the conversion amounted to 26% of the butene feed and the selectivity to butadiene was 72%; using catalyst "B" the conversion was 19% and the selectivity was 80%; and in using catalyst "C" the conversion was 17% and the selectivity 72%.

In order to determine the life of the catalyst or, in other words, the length of time during which it could be used, catalyst "A" was tested for 437 hours and at the 4th, 172d, 364th hour and at the end of the test the catalyst had the activity indicated in the table below:

| | Hours of test | | | |
|---|---|---|---|---|
| | 4 | 172 | 364 | 437 |
| Per cent conversion | 18 | 20 | 23 | 20 |
| Per cent selectivity | 89 | 77 | 75 | 70 |

In making the above runs the reaction temperature or, that is, the average temperature of the catalyst, was about 1200° F., the feed rate was 500 volumes at 0° C. and 1 atmosphere pressure of butene feed per volume of catalyst per hour, the butene being diluted with 10 times its volume of steam. It will be noted from the above that after 437 hours the catalyst was still active, that is to say, it was capable of being used. It will be understood, of course, that during this 437 hours of run the catalyst was periodically regenerated to remove carbonaceous deposits placed thereon by the reaction. In other words, the butene supply was discontinued at the end of each hour and during the next hour the catalyst was treated with steam.

My researches indicate that the above catalysts are active at temperatures within the range of from 1000–1600° F., the preferred range being from 1100–1300° F.

As to the composition of the catalyst, the amount of copper oxide may vary from 50% to 96%; the active component, that is the iron oxide, chromium oxide, etc. may vary from 3% to 49%; and, finally, the activator, that is, the potassium oxide may vary from 1% to 15%, although the proportions I have given before are preferred. Instead of using potassium oxide, I may use other alkali metal oxides and alkaline earth oxides, but potassium oxide gives the most active catalysts.

With respect to pressure conditions, it is preferable to operate so that the reactant, that is the butene or other reactant, is under a relatively small partial pressure because the diolefin which is formed, or the mono-olefin in the case of the alkylated aromatic, is liable to undergo polymerization thus reducing the selectivity and as a consequence the yield is reduced. Hence, I prefer to operate at partial pressures of from 0.04 to 0.5 atmosphere absolute by diluting the butene with steam.

As previously indicated, regenerating the catalyst may be accomplished by forcing steam at say 1150° F. to 1300° F. through the catalyst whereupon the carbonaceous deposits are converted to gaseous constituents which may be withdrawn.

My catalyst is effective in the dehydrogenation of alkylated aromatics such as ethyl benzene, propylbenzene, etc. to form compounds such as styrene, methyl styrene, etc. In other words, where a paraffinic hydrocarbon containing an aromatic substituent is dehydrogenated, my catalyst is active to cause the dehydrogenation of the paraffinic radical to produce the corresponding aromatic substituted olefin by hydrogen removal.

If desired, a small amount of air such as 1% or 2% may be mixed with the steam entering the body of catalyst during regeneration, as an aid in the regeneration.

What I claim is:

1. The method of dehydrogenating butene to form butadiene which comprises contacting butene admixed with steam with a catalyst consisting of a major portion of copper oxide, a minor portion of a metal oxide selected from the class consisting of chromium oxide, iron oxide and manganese oxide, and a promoter consisting of a compound of potassium.

2. The method set forth in claim 1 in which the promoter is potassium oxide.

3. The method set forth in claim 1 in which the temperature of the catalyst and the reactants is from 1100° F. to 1300° F. in the reaction zone.

4. The method of dehydrogenating butene which comprises mixing butene in superheated steam, contacting the mixture at a temperature within the range of about 1100° F. to 1300° F. with a catalyst consisting of 75% by weight of copper oxide, 20% by weight of chromium oxide, and 5% by weight of potassium oxide while maintaining the butene under a partial pressure of from .04 to 0.5 atmosphere absolute.

KENNETH K. KEARBY.